United States Patent
Gould et al.

(10) Patent No.: US 7,127,304 B1
(45) Date of Patent: Oct. 24, 2006

(54) SYSTEM AND METHOD TO PREDICT THE STATE OF A PROCESS CONTROLLER IN A SEMICONDUCTOR MANUFACTURING FACILITY

(75) Inventors: Christopher Gould, Quinton, VA (US); Abeer Singhal, Delhi (IN)

(73) Assignee: Infineon Technologies Richmond, LP, Sandston, VA (US)

( * ) Notice: Subject to any disclaimer, the term of this patent is extended or adjusted under 35 U.S.C. 154(b) by 0 days.

(21) Appl. No.: 11/131,957

(22) Filed: May 18, 2005

(51) Int. Cl.
   *G05B 11/01* (2006.01)

(52) U.S. Cl. .................................. 700/20; 700/121
(58) Field of Classification Search .................. 700/2, 700/4, 19, 20, 109, 121

See application file for complete search history.

(56) References Cited

U.S. PATENT DOCUMENTS

| | | | |
|---|---|---|---|
| 5,640,491 A * | 6/1997 | Bhat et al. | 706/25 |
| 7,053,863 B1 * | 5/2006 | Glen et al. | 345/2.3 |
| 2004/0049299 A1 * | 3/2004 | Wojsznis et al. | 700/29 |
| 2005/0060426 A1 * | 3/2005 | Samuels et al. | 709/238 |
| 2005/0063307 A1 * | 3/2005 | Samuels et al. | 370/235 |

OTHER PUBLICATIONS

Moyne, Telfeyan, Hurwitz and Taylor, article entitled: "A Process-Independent Run-to-Run Controller and its Application to Chemical-Mechanical Planarization," 1995 SEMI/IEEE Advanced Semiconductor Manufacturing Conference and Workshop, Aug. 15, 1995, 21 pages.

* cited by examiner

*Primary Examiner*—Leo Picard
*Assistant Examiner*—Chad Rapp
(74) *Attorney, Agent, or Firm*—James L. Katz; Brinks Hofer Gilson & Lione

(57) ABSTRACT

The disclosed system and method relates to the prediction of processing tool control parameters, i.e. controller state, for a particular processing tool, which has little or no utilization history, i.e. is data starved or has not gone through the learning curve, for a given process, or has undergone an event for which the current controller state has been reset or is otherwise now sub-optimal. The prediction is based on the processing tool control parameters of a substantially similar processing tool, being used in a substantially similar fashion to the given situation, which has significant utilization history. The processing tool having significant utilization history may be the same processing tool as the processing tool with little or no processing history where a manufacturing event disrupts the operations thereof. In this case, the pre-event control parameters and utilization history may be used, according to the disclosed embodiments, to predict the post-event controller state. Effectively, the disclosed embodiments provide for the processing tool with little or no utilization history to inherit the controller state, i.e. the evolved control parameters, of the processing tool with significant utilization history. Thereby, the processing tool with little or no utilization history is spared having to go through the learning curve, and the associated costs in delay and resources, to arrive at a particular controller state, i.e. the processing tool does not have to go through the iterative process-evaluate-adapt procedure to refine its control parameters to achieve results within the desired specifications.

35 Claims, 7 Drawing Sheets

SYSTEM AND METHOD TO PREDICT THE STATE OF A PROCESS CONTROLLER IN A SEMICONDUCTOR MANUFACTURING FACILITY

REFERENCE TO RELATED APPLICATIONS

The following co-pending and commonly assigned U.S. patent application has been filed on the same date as the present application. This application relates to and further describes other aspects of the embodiments disclosed in the present application and is herein incorporated by reference:
U.S. patent application Ser. No. 11/132,069, "SYSTEM AND METHOD FOR REAL TIME PREDICTION AND/OR INHERITANCE OF PROCESS CONTROLLER SETTINGS IN A SEMICONDUCTOR MANUFACTURING FACILITY", filed herewith.

BACKGROUND

The fabrication of integrated circuits is a complex and expensive process which requires extremely tight tolerances and has little margin for error. A particular integrated circuit, such as a microprocessor, is fabricated according to a set of recipes which specifies the materials and processing steps which are necessary to result in a finished working product in accordance with the design specification. Typically, integrated circuits are fabricated in batch on wafers, wherein multiple copies of the particular integrated circuit are fabricated on a single wafer and later separated. Multiple wafers may be processed in parallel to achieve a desired manufacturing volume.

Each of the recipes further details the parameters of a particular process step, e.g. what processing machine as well as what control parameters for the particular processing machine should be used. Processing machines include chemical vapor deposition ("CVP") devices, chemical-mechanical-planarization ("CMP") devices, etching devices, such as wet etching or plasma etching devices, optical or electron beam, a.k.a., e-beam, imaging devices, such as scanning electron microscopes, etc. These processing machines perform their particular process on one or more wafers subject to a myriad to control parameters. Often, the same process/processing machine is repeatedly used using different recipes so as to fabricate the different parts/layers of the integrated circuits, all according to the overall design specification. For example, a typical integrated circuit will be processed through several different CVP, CMP, lithography and etch processes, each according to a particular recipe, to build up the many layers of transistors and interconnections which make up the integrated circuit. Control parameters, as provided in the recipe, for these processing machines, which may vary among different products, different processing machines and/or different processing stages, include, but are not limited to, duration of processing, processing rate, temperature, pressure, composition of processing materials/chemicals, and other variables.

In a manufacturing environment, a particular recipe will be performed over and over on batches of wafers, referred to as lots, with each processing machine being used to repeatedly perform the same process with the same or different control parameters, depending on the particular stage of production or, as will be described below, on the results of quality control inspections/measurements. In addition, the manufacturing facility may provide multiples of particular processing machines so as to allow the parallel processing of batches of wafers and boost production capacity. Further, the particular manufacturing facility may be used to produce many different types of integrated circuits, according to different recipes, i.e. using the same processing machines with the same or different control parameters. In actual production, some production runs of a given integrated circuit may require using more of the available manufacturing capacity than other runs, i.e. using more of the available processing machines to run processes in parallel if necessary. The amount of the available capacity which may be used may be dependent upon the production goals for the particular product during a particular time period and may vary from day to day. Further, production may be affected by the unavailability of processing machines, such as unavailability due to required maintenance or repair, expected or unexpected, the return of processing machines back into service, or other manufacturing events.

The control of workflow through the manufacturing process is referred to as process control. Process control refers to the overall concept of controlling the manufacturing processes, i.e. the implementation of a given set of recipes, to end up with functional products within the specified tolerances, i.e. functioning integrated circuits. The wafer fabrication process requires a high degree of precision, where one error can compromise an entire production, necessitating a high degree of process control.

Essentially, the object of process control is to repeatedly produce a product that falls within its design and operational specifications at a profitable rate. Factors which may affect the results of a given process include: environmental factors, such as the ambient temperature or humidity; process machine factors, such as calibration, operating temperature and wear; and materials factors, such as the composition of the product undergoing processing or the composition of process consumables. These factors may vary over time as well as between similar processing machines and similar recipes, necessitating continued evaluation and refinement of the control parameters of the process, i.e. refinement of the recipe, to compensate.

Process control is accomplished by enacting quality control methodologies in the production process to monitor the quality of production and detect problems quickly so that they may be resolved quickly. In cases where in situ measurements are not possible, it is necessary to evaluate the finished product to determine if the specified tolerances are met. For example, after each processing step, measurements or testing may be performed on a sample wafer, either an actual production wafer or a test wafer included in the production run, to determine if the processed product is within the specified tolerances. Alternatively, the particular process may be tested on a test wafer/batch before being used in actual production. Where the resultant product is not within the specified tolerances or the product is within the specified tolerances but testing indicates that the process is drifting toward being out of tolerance, measures can be taken to correct the situation, such as by adjusting the control parameters of the particular processing machine, i.e. modifying the recipe. This is also referred to as Run-to-Run control, wherein the production results of a particular processing machine are continuously measured/evaluated. These measurements/evaluations are then utilized to adjust the recipe, i.e. the processing parameters of the processing machine, prior to the next run through that processing machine to compensate for any detected errors. This process is iteratively repeated such that the processing parameters of a given recipe on a given processing machine are continuously evaluated, adjusted and refined, effectively evolving with each successive generation of product, ultimately to a relatively stable state. Given the variability in the factors that can affect the results of a given process, it is likely to have two similar processing machines performing the same process but with different recipes to achieve results according to the design specification.

Statistical process control refers to the use of sampling and statistical computations to analyze the measured quality control data. This analysis can then be used to more accurately modify the recipe. Further this analysis may be used to predict and correct trends in the process results, such as a trend that the process is tending to deviate outside of the specified tolerances, though it has not yet done so.

General process control techniques, including statistical process control techniques, work well for high volume production runs, or production runs having a relatively stable throughput, because the large number of production runs provide many opportunities to test and refine the various process control stages and the consistent use of the various processing machines acts to keep those processing machines properly calibrated and their control parameters in a consistent/relatively stable state of refinement. Further, the time/resource cost of running test production runs to ensure accurate processing is minimal compared to the time/resource costs devoted to actual production. However, such techniques do not work well for low volume production runs or production runs where the production volume may vary from day to day. In such situations, there may not be enough actual production runs to generate statistically significant quality control data so as to be able to refine the various process control stages and further, the use of test production runs, which likely result in unusable products, may not be justifiable based on the cost/resources consumed as compared to the volume of actual production. In addition, for varying production volumes, excess production capacity on any one day may result in idle process machines for that day, while on a day with more significant demand, those idle process machines will be put into operation, necessitating re-calibration and testing of recipes to ensure production tolerances are met on the formerly idle processing machines being pressed into service. Similarly, processing machines may be idled by the need for maintenance, repair or due to some other event, again necessitating re-calibration and testing of recipes to ensure production tolerances are met before they are put into production.

Accordingly, there is a need for a method and system of process control which can be used efficiently in low volume production, variable volume production, as well as in situations where an unanticipated manufacturing event occurs.

DETAILED DESCRIPTION OF THE DRAWINGS AND PRESENTLY PREFERRED EMBODIMENTS

Figure 1:
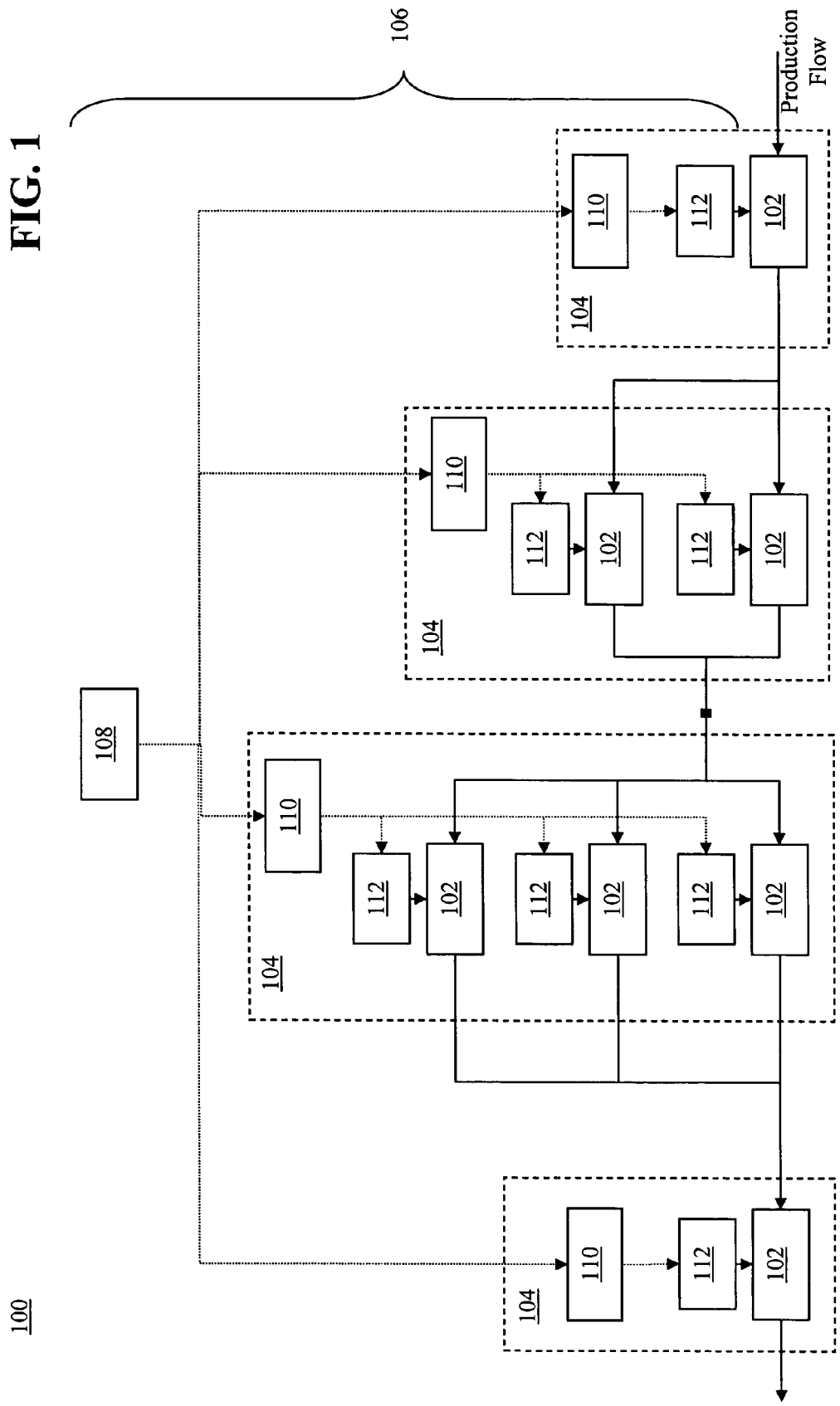
FIG. 1 depicts a block diagram of an exemplary semiconductor manufacturing environment for use with the disclosed embodiments.

FIG. 1 shows a block diagram of an exemplary semiconductor manufacturing environment/factory 100 featuring various processing machines/tools 102, such as lithography machines, Chemical Vapor Deposition ("CVP") machines, Chemical Mechanical Polishing ("CMP") machines, etch chambers, etc., with similar processing tools 102 arranged within tool groups 104. A tool group 104 may be arranged for parallel/volume processing of semiconductor wafer through a given process. A hierarchy of process control systems 106 is used to control the processing tools 102 and direct the manufacturing process. The process control hierarchy 106 may include a factory level process control system 108 which oversees the entire production process, a tool group control system 110, coupled with the factory level process control system 108, which is responsible for controlling operation of a given set of processing tools 102 in a tool group 104, such as a set of CMP machines, and a processing machine control system 112, coupled with the tool group control system 110, for each processing tool 102 within each production cell 104 which controls the particular machine 102. Herein, the phrase "coupled with" is defined to mean directly connected to or indirectly connected through one or more intermediate components. Such intermediate components may include both hardware and software based components.

At each level of the process control hierarchy 106, the process controllers 108, 110, 112 may utilize the described run-to-run and statistical process control iterative "process-evaluate-adapt" feedback loop to constantly evaluate the resultant products and adjust the recipe/control parameters of the various process controllers 108, 110, 112 to maintain the production within the specified tolerances. It will be appreciated that the disclosed embodiments may be used with any suitable semiconductor manufacturing facility and the number, type and logical/physical arrangement of processing tools 102 and process control systems 106 is implementation dependent, and all such implementations are contemplated herein.

To clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions here before or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

As described above, the iterative "process-evaluate-adapt" procedure results in continually evolving control parameters for a given recipe for a given processing tool(s) 102 whereby the processing tool 102 essentially learns and maintains the optimal parameters, accounting for variability in environmental, materials and process tool factors, to consistently produce a product/perform a process within the specified tolerances with each successive run/lot, whether actual production runs or test runs. This is also referred to as "run to run" or "R2R" control. At any given moment, the present state of these control parameters is referred to as a controller state or controller set-point and may be expressed as a set of values, such as a numeric or alphanumeric string. The time/resources iteratively consumed to arrive at a given controller state is referred to as a "learning curve." As used herein, the term "process" refers to the performance of a particular recipe on a particular part. A "recipe" refers to the specification of individual process steps, a control model as will be discussed below, and the attendant control parameter values, either the initial values or the present values, thereof, that are to be performed by a particular semiconductor processing tool. Accordingly, a process which operates on one type of part may be a different from a process which operates on another type of part, even though both processes use the same recipe.

The disclosed system and method relates to the prediction of the present state of the processing tool control parameter values, i.e. controller state, for a particular processing tool 102, which has little or no utilization history, i.e. is data starved or has not gone through the learning curve, for a given process, or has undergone an event for which the current controller state has been reset or is otherwise now sub-optimal. It will be appreciated that the disclosed embodiments may be applicable to any tool which utilizes a statistical process control along side an integrated engineering process control system, as will be described.

The prediction is based on the processing tool control parameter values of a substantially similar processing tool, being used in a substantially similar fashion to the given situation, which has significant utilization history. The processing tool having significant utilization history may be the same processing tool as the processing tool with little or no processing history where a manufacturing event disrupts the operations thereof. In this case, the pre-event control parameter values and utilization history may be used, according to the disclosed embodiments, to predict the post-event controller state. Effectively, the disclosed embodiments provide for the processing tool with little or no utilization history to inherit the controller state, i.e. the evolved control parameter values, of the processing tool with significant utilization history. Thereby, the processing tool with little or no utilization history is spared having to go through the learning curve, and the associated costs in delay and resources, to arrive at a particular controller state, i.e. the processing tool 102 does not have to go through the iterative process-evaluate-adapt procedure to refine its control parameter values to achieve results within the desired specifications. It will be appreciated that the semiconductor processing tools do not necessarily have to be the same type of semiconductor processing tools in order to be substantially similar and that substantial similarity may exist when any one or more operating parameters of the two semiconductor processing tools can be correlated, such as by utilizing regression or time series models, and data from both tools is available to validate the correlation. For example, correlation of the Pad Pressure of a CMP processing tool with the Alignment Translation parameter of a lithography processing tool would allow the disclosed embodiments to predict controller state as described herein.

Run-to-run (R2R) control is a form of discrete process and machine control in which the product recipe with respect to a particular machine process is modified ex-situ, i.e., between machine runs, so as to minimize process drift, shift, and variability. This type of control is a critical component of the hierarchical scheme that is widely suggested for facility control in the semiconductor manufacturing arena. Run-to-run control is a generic methodology in control of semiconductor manufacturing processes. For example, in semiconductor manufacturing, if the perturbations are small enough, they can be compensated successfully using the exponential weighted moving average (EWMA) method. But, unfortunately, this is not always the case. For example, many plasma processes have been shown to exhibit small to large non-linearity in behavior. Furthermore, the photoresist process requires dynamic process models too. Thus it is necessary to develop nonlinear algorithms to solve this type of problems.

The process of continuously evaluating production and refining control parameters is necessary due to the multitude of variables which affect the process result and which may fluctuate over time, and the fine tolerances which are required. Exemplary variables which effect the result of processing include environmental variables, such as temperature, humidity, contaminants, etc., which may vary among each run of a given process and/or among similar semiconductor processing tools running the same process. Other variables include processing machine 102 variables, such as operational tolerances, wear and calibration, as well as variations in materials, such as variations in the compositions of the parts/work pieces undergoing processes or variations in the component/processing materials used/consumed in the processing of the parts, such as the purity or concentration of process gasses, all of which may vary among each run of a given process and/or among similar semiconductor processing tools running the same process. Accordingly, these variables may be different between process runs on the same tool 102, or between the different processing tools 102 within a given processing cell 104 or among the entire factory 100, and, therefore, the controller state for one processing tool 102 may vary from run to run or vary from that used by another processing tool 102 of same type performing the same process on the same type of part. Typically, each processing tool 102 must be brought up its own learning curve to establish and maintain a controller state which results in products within the acceptable tolerances and which accounts for the nuances of the particular tool 102.

In general, a R2R based control system may include:

(1) A metrology interface component: As R2R control is a form of feedback control, it requires measured output data. The metrology interface component could be automated (e.g., obtaining data from a metrology unit via a Semiconductor Equipment Communication Standard ("SECS") interface and communicating it to the R2R controller via a TCP/IP link), manual (e.g., prompting a user to type in metrology data obtained manually), or a combination thereof;

(2) One or more R2R optimization and/or control algorithms or process models: This component utilizes metrology information and some form of knowledge of the process to make recommendations on how to modify equipment and/or process inputs so as to optimize or control the process. Generally the algorithm(s) utilizes the history of the process in some form and a process model, in conjunction with a set point or state. The methods utilized by these algorithms vary widely, from simple SPC alarm reporting to heuristically-based optimal solution searching. More than one algorithm may be required in the R2R controller so that the system may provide optimization/control over a required domain; these algorithms must be utilized in a complementary fashion;

(3) A recipe download component: This component facilitates the communication of recipe advice information from the R2R control system 110 to the equipment controller, such as the process controller 112. This can be accomplished for example through an automated communication network link or via a graphical user interface (GUI) presenting the recipe advice to a user;

(4) A process monitoring component: Once a recipe is downloaded to a process, processing may begin. Metrology may be conducted for this run only after processing has completed. Thus some form of synchronization is required between the process and the R2R controller. This duty is performed by a process monitoring component. In its simplest form, this component could just be a trigger to the R2R controller indicating that the metrology data for the next run is now available (e.g., a key stroke). In a more complex form, the component could monitor the process in-situ, and generate events to the R2R controller as necessary so as to address warnings, alarms, etc., in addition to normal processing; and (5) A central control navigation component: the controller must contain a core component that coordinates the information of the other four components to effect R2R control. In the simplest form, this navigation component could be developed as a software program that provides non-robust and inflexible R2R control. In most applications it is required that this navigation component provide a dynamic and flexible control environment.

As discussed above, one quality that sequential controllers should possess in the semiconductor manufacturing environment is the ability to adapt to multiple and varying control schemes. Many semiconductor processes are not well understood and process response surfaces are constantly shifting, drifting, and changing shape. The control schemes for these processes likewise must vary with time. Further, many processes and their process controllers are expected to exist in a flexible manufacturing environment. Thus controllers must be able to adapt to their changing environment by navigating through a robust and necessary complex control paradigm during operation. This navigation must include obtaining, during runtime, information from outside sources where necessary so as to adapt to new and unforeseen control situations. As an example, the controller may be able to query an expert user or a neural network as necessary during runtime to formulate responses to unforeseen control events and learn how to service these events in the future.

For example, Chemical-Mechanical Planarization (or polishing) has become a widely accepted technology for multilevel interconnects. In addition to providing planarization, CMP has also been shown to reduce defect density and define vertical and horizontal wiring. CMP is basically a surface planarization method in which a wafer is affixed to a carrier and pressed face-down on a rotating platen holding a polishing pad. A silica-based alkaline slurry is applied during polishing thus providing a chemical and mechanical component to the polishing process. The general process goal is the preferential removal of high material across the wafer. Typical process metrics include removal rate (or amount removed) and within-wafer uniformity. Equipment and process parameters that are typically utilized to control the process include polish time, pressure, rotation speed, and parameters that impact the conditioning of the polishing pad such as conditioning profile.

There are a number of characteristics of CMP that make it an ideal candidate for R2R control. First, the process is not well understood. This combined with factors such as inconsistency and degradation of consumables, and lack of sensors and actuators makes CMP a challenging candidate for control. Second, as there is a lack of in-situ sensors for CMP, in-situ control is not yet feasible; thus R2R control appears to be the tightest form of control that can be applied to CMP at this time.

Figure 2:
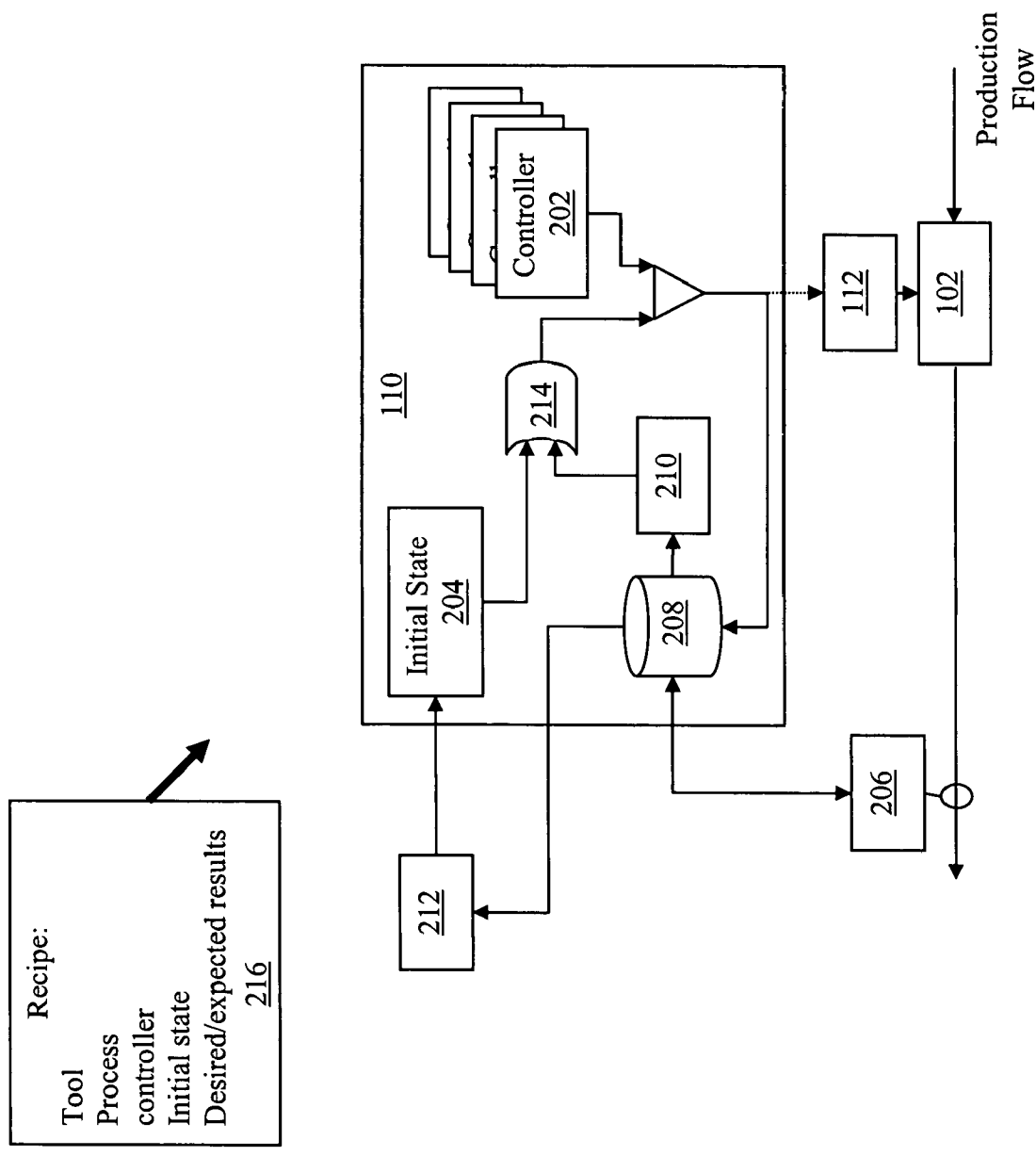
FIG. 2 depicts a block diagram of a process controller for controlling one or more semiconductor processing tools for use with the disclosed embodiments.

FIG. 2 depicts an exemplary tool group 104 of the manufacturing environment 100, according one embodiment, including process level/R2R controller 110 coupled with a tool/equipment controller 112 which is controlling a semiconductor processing tool 102, such as a CMP machine. The process level controller 110 is operative to implement a recipe, also referred to as a control loop, on said semiconductor processing tool 102, the recipe specifying which type of semiconductor processing tool 102 to use, what process should performed, i.e. the type of part to be processed and the process steps and parameters thereof, as well as a specification of the desired or expected results of the process. The recipe further includes a specification of which controller/model 202 to use on the process level controller 110 and what should be the initial state or set point of the control parameters of the selected controller 202. A controller 202 is a process model or core/software algorithm which models the rough behavior of the semiconductor processing tool 102 and the particular process and allows the process level controller 110 to understand how the process will operate and how to control the results thereof. Semiconductor processing tools 102 are multi-faceted devices typically capable of performing numerous different functions/processes in numerous ways depending upon the manufacturing environments. As single controller 202 would be too cumbersome to model every aspect and function that the semiconductor processing tool 102 is capable of, typically, multiple different controllers 202 are provided for a given semiconductor processing tool 102. The recipe specifies which of these controllers 202 to utilize for the particular process. Controller 202 selection is based on the needs of the given process (such as the critical characteristic(s) that the tool is being used to achieve which may ignore other characteristics (which the tool could control but are not an issue for the particular process).

The controller 202 features a controller state, also referred to as a set-point, which is the particular values of all of the variables/parameters/inputs which provide for specific control the controller 202 and allow fine tuning of its operation. As described above, the controller state may be expressed as a set of values, such as a numeric or alphanumeric string. In one embodiment, the controller state is expressed as a binary value. The recipe initially specifies an initial state, also referred to as a seed value, for the controller state which sets up the controller 202 to run the process the first time. Once the process has been run, the results are evaluated and the controller state is adjusted to optimize the results, as was described in detail above.

Referring back to FIG. 2, in one embodiment, the process level controller 110 logically includes a set of available controllers 202, an initial state 204 coupled with the controllers 202, run-to-run ("R2R") logic 210 also coupled with the controllers 204 and a controller state/metrology history database 208 coupled with the logic 210. Metrology logic 206 is also provided, coupled with the database 208, which may be a part of the process level controller 110 or external thereto. The initial state 204 may be a memory, register or other input which receives the initial controller state set by the recipe and passes it to the selected controller 202. The initial controller state 204, in conjunction with the selected controller 202, is then used to execute the process, specified by the recipe, on the semiconductor processing tool 102 via the tool controller 112. The metrology logic 206 is coupled with the semiconductor tool 102 so as to be able to evaluate the results of the process. These evaluations are communicated to, and stored in, the database 208 directly, or, alternatively, via the R2R logic 210. The R2R logic 210 evaluates the results of the process received from the metrology logic 206 and, optionally, previously stored metrology results and/or prior controller states, to adjust the controller state from its present state to compensate for any deviations or potential deviations of the process results, as was described above. It will be appreciated that there may be other methods/implementations for the described feedback control system. The R2R logic 210 may utilize statistical process control or other algorithms to perform the evaluation and adjustment. As can be seen, therefore, the described process controller 110 provides a system which continually analyzes and adjusts the controller state to control the selected controller and achieve substantially optimal results.

As was discussed, it may take several iterations of executing the process, evaluating the results and adjusting the controller state to ultimately obtain and maintain substantially optimal results from the process. Should some form of manufacturing event occur, this learning curve may be lost and the process of fine tuning the controller state would have to be performed again, incurring a significant waste of resources.

Manufacturing events include scheduled or unscheduled situations or occurrences which may affect the tolerances of the particular semiconductor process tool 102 or otherwise require a reset and re-fine tuning of the controller state to account for a substantial change in the operation of the tool 102, and which cannot be accounted for efficiently via the R2R control logic. Such events include replacement of parts or other maintenance, tool 102 down-time, such as where the tool 102 is allowed to cool down, tool 102 re-calibration, use of the tool 102 for a new process that has never been run before on the tool 102, or where the given process has not been run on the tool 102 for a significant amount of time, e.g. the R2R logic 210 is data starved, i.e. lacks sufficient historical data to adequately adjust the controller state. In each case, such an event may require multiple iterations of the process-evaluate-adapt methodology to bring the process within the specified margins, which may represent an unacceptable resource cost.

In a R2R controlled manufacturing environment, a manufacturing event, such an event requiring a new processing tool 102 to be used or a processing tool 102 to be switched from one process to another, such as a switch from processing one part type another part type, typically is handled by processing one or more pre-cursor/Send Ahead lots ("SAHD"), so that the run-to-run controller can re-learn the optimal process settings, as was described above. Larger high-volume facilities may use mathematical models alongside run-to-run (R2R) control to minimize the effects of the Run to Run controller to bring the controller back to up-to speed.

The disclosed embodiments provide a system and method which allows a processing tool 102 to inherit the controller state of another processing tool 102, thereby avoiding the learning curve required by R2R control, while accounting for the variances which distinguish the tools 102 and/or processes from each other. The disclosed embodiments may be used in any situation where a processing tool 102 is to be pressed into service for a particular task for which it has little historical utilization data and where the other similar processing tools 102 are available with significant utilization data relating to the particular task. For example, the disclosed embodiments may be used in a manufacturing environment where varying production results in some processing tools 102 being idled on one day and being pressed into service on another day. In this situation, the particular processing tool 102 which is being pressed into service on a given day may inherit the control parameters of another similar processing tool 102 that has been continuously used. In a situation where the idle machine 102 was idle due to maintenance or some other manufacturing event, the prior utilization history of that tool 102 may serve as the reference rather than another tool 102.

In another example, the disclosed embodiments may be used in a mixed manufacturing environment where more than one type of product is manufactured, each product utilizing the various processing tools 102 according to their own recipe. In this situation, a processing tool 102 may have historical utilization data regarding one of the products but little or no historical utilization data for the other product. In this situation, the processing tool 102 may inherit the control parameters for another processing tool 102 having historical utilization data for both products.

With the Semiconductor industry today turning into a highly competitive market and with new technologies emerging at the present pace, it is imperative for manufacturing facilities to be flexible enough to accommodate these new products into there manufacturing portfolios. The disclosed embodiments focus on a mechanism to predict process control settings for controllers by applying the concept of inheritance. As described above, the control systems available today rely on the Run to Run control system along with statistical process control methods to adjust the control settings to approach the specified target. In most cases due to low production volumes based on market demands, it is costly and time consuming to wait for the Run-to-Run system to tune the product process controller to hit target.

The present run-to-run system, applies statistical process control to monitor and statistical algorithms to control a manufacturing process. Therefore, if a low volume product is to be introduced for manufacturing the system has to relearn the process to determine optimal process settings.

The mechanism of the disclosed embodiments does not require any additional setup as the information required for predicting settings is already used by Statistical Process Control in the run-to-run control system.

The prediction mechanism uses algorithms which search for a processing machine 102 bearing similar attributes to the processing machine where the product is to be processed. Once the prediction mechanism locates this processing machine 102, the prediction mechanism searches for a product-controller 202 which is available on both the tools. Then using a mathematical algorithm, it builds a relation between the product-controllers 202 and processing machines 102. This relation is used by the mechanism to inherit settings to predict the most optimal controller setting on the processing machine 102 in question. The mechanism relies on data which is collected and recorded as run to run control history and is available in almost all run-to-run control systems. This data is also updated regularly in order for SPC to monitor the control system. The main goal of the disclosed embodiments is to minimize the time required to introduce a low volume product into production, henceforth reducing the necessity to process SAHD/Pre-cursors which in turn minimize possible rework and Out of Control Events. The core benefit is that it provides the manufacturing facility the much needed flexibility to introduce and manufacture products in-tune with the present market demand and still maximize on throughput.

Further, the mechanism of the disclosed embodiments may continuously predict process control settings for controllers in real time mode. This permits, for example, the process control mechanism to adapt as process response surfaces shift, drift or change shape, as was described. As described above, in the case of manufacturing events, which may be scheduled or unscheduled, all controllers connected with the event may need to be reset so they may relearn the process settings. This may be a very costly and taxing process. The disclosed embodiments are capable of predicting the controller settings, continuously and real time, thereby reducing the impact for systems to relearn processes.

Figure 3:
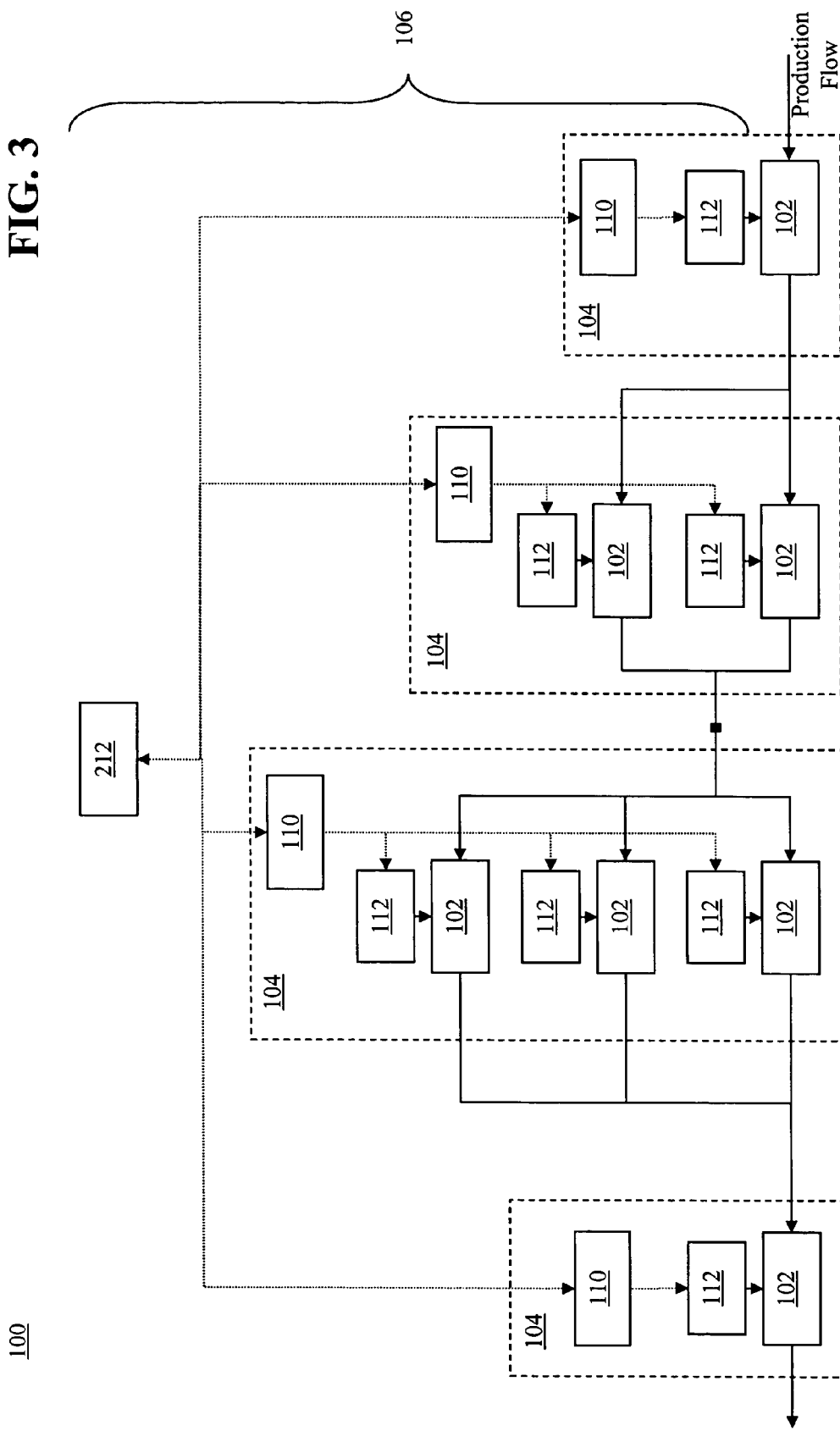
FIG. 3 depicts a block diagram of a system for predicting process controller states, according to one embodiment, for use in the manufacturing environment of FIG. 1 and with the process controller of FIG. 2.

FIG. 2 further shows the controller state prediction logic 212, according to one embodiment, which alleviates the need to run multiple iterations of the process to bring the process results within acceptable tolerances. The prediction logic 212 is coupled with the database 208 and the initial state input 204 and acts to predict a more optimal initial state for the selected controller 202 so as to likely result in substantially optimal process results without having to execute multiple iterations of the process on the tool 102. As shown in FIG. 3, the prediction logic 212 may be coupled across all of the process controllers 110 of the particular manufacturing environment 100. In one embodiment, separate prediction logic 212 is provided for each set of tools 102 of a particular type.

Figure 4:
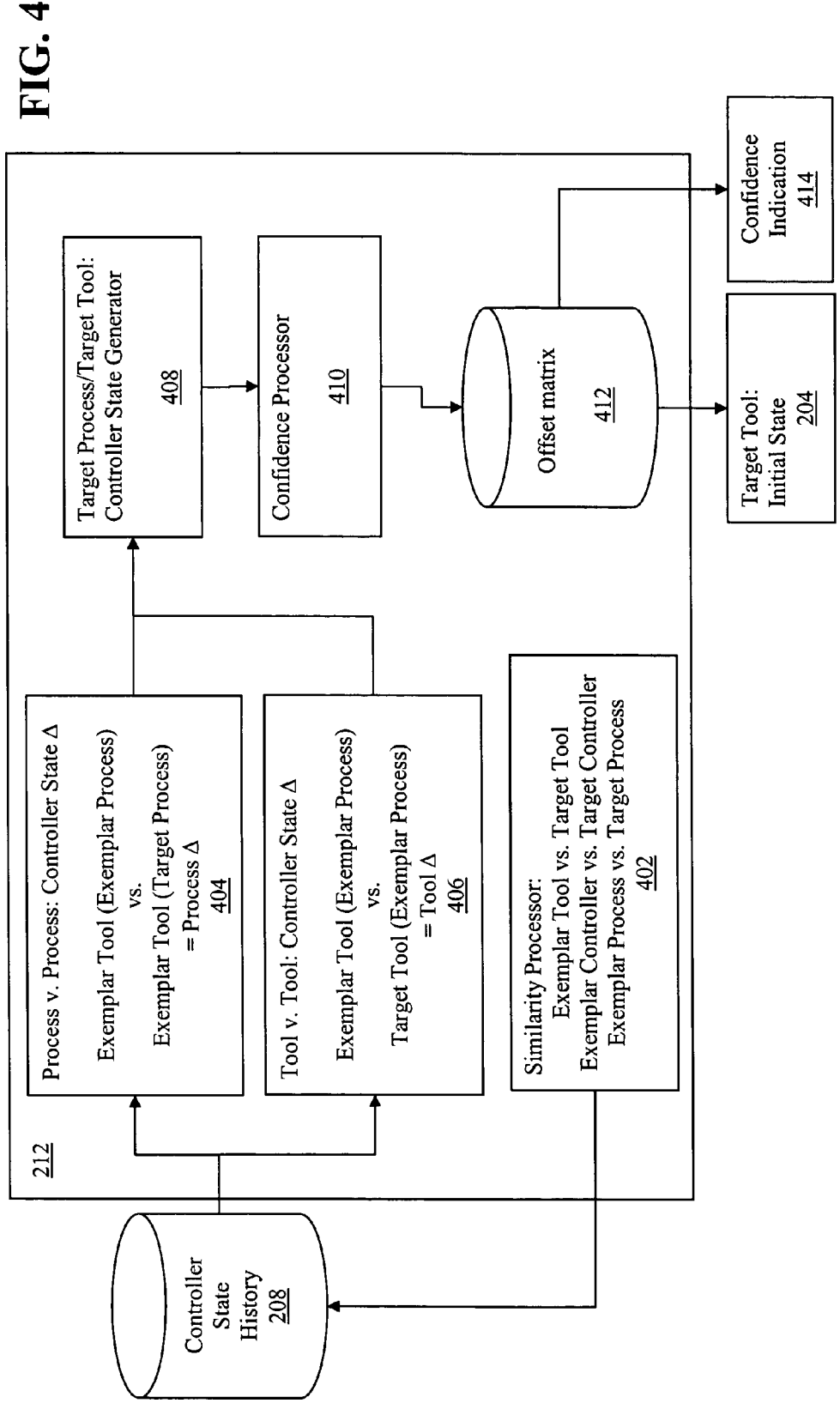
FIG. 4 depicts a block diagram of a controller state prediction processor for use with the system of FIG. 3, according to one embodiment.

FIG. 4 shows a more detailed block diagram of the prediction logic 212. The logic 212 includes a similarity processor 402, logic to compute a process v. process ("pvp") controller state delta 404, logic to compute tool v. tool ("tvt") controller state delta 406, and a controller state generator 408, coupled with both the pvp controller state and tvt controller state logic 404 406. In an alternate embodiment, the prediction logic 212 may further include a confidence processor 410 coupled with the controller state generator 408 and an offset matrix 412 coupled with the confidence processor 410, as will be described below. It will be appreciated that the prediction logic 212 may implemented in software, hardware or a combination thereof. In one embodiment, the prediction logic 212 is a software program which executes on a workstation coupled with the process control hierarchy 106.

The operation of the disclosed embodiments may be exemplified by at least one of the following scenarios. In a first scenario, a target tool has been running both a target process and an exemplar process when an event occurs that affects the controller state. In order to get the target tool back up and running as quickly as possible, the prediction logic 212 looks at the pre-event history of controller states of a given controller 202 of running both the target and exemplar processes and computes a delta value, i.e. the pvp delta, between the historical controller states of each process. In one embodiment, the delta is computed for each parameter value of the controller state. At least one post-event test lot is then run for the exemplar process and the controller state is determined. As the target tool/controller is acting as a point of reference for the prediction logic 212 to determine if a significant process shift has occurred, one metrology point may suffice but additional points will improve the computation of the optimal target controller state. The computed process delta, i.e. pvp delta which in this case is also the controller state delta, is then applied to the controller state determined from running the exemplar process to obtain a predicted substantially optimal target controller state for running the target process. In this way, the target process does not have to be iteratively executed to optimize the controller state. Note that since the same tool was used as the basis for the prediction, the tool v. tool delta will be zero, unless the event caused significant changes to the tool 102 and therefore need not be computed.

In a second scenario, a target tool has a history of running an exemplar process, i.e. has many gone through many iterations of the exemplar process and the controller state is substantially optimal and relatively stable. However, the target tool has little or no history running a target process. Accordingly, the prediction logic 212 will utilize the history databases 208 to determine a similar exemplar tool and an exemplar controller 202 that has history running both the exemplar and target processes. This determination may be made mathematically, from a list of candidate process tools which include the target controller 202 in its portfolio, such as by a clustered grouping. For example, where the operating parameters of a particular tool are pre-defined, such as the process layers which can be operated upon or the wavelength of light utilized, these characteristics can be listed in the history database 208 such that tools of similar characteristics can be clustered, e.g. sorted, together to create a pool of candidates to choose from. While the same control model/algorithm should be used, different proportional/integral/derivative ("PID") control loops may be used. The longer the history that the exemplar tool and controller have at running both the exemplar and target processes may yield a higher confidence in the computed correlation, though, as the exemplar tool/controller acts as a point of reference, a single metrology point will be sufficient. In one embodiment, approximately 30 observations results in an acceptable statistical approximation. The prediction logic 212 will then compute a pvp delta between the historical controller states of the exemplar and target processes on the exemplar tool. The prediction logic 212 will also compute a tvt delta between the historical controller states of the exemplar processes run on the exemplar and target tools. Using the pvp and tvt deltas, a controller state delta for the target tool is computed. The controller state delta is then used by the prediction logic 212, in conjunction with the controller state of the exemplar process on the target tool, to compute the predicted controller state for the target process on the target tool. This is a similar analysis as used in the first scenario, however in that case, the tvt delta was likely zero because the exemplar and target tools were the same tool, pre and post event.

In yet another scenario, a flexible manufacturing environment is provided which permits tools 102 to be flexibly brought on-line to run different processes, such as for short production runs of a given part or to handle dynamic production capacity requirements. In this scenario, the prediction logic 212 monitors all tools 102 and the various processes being run on them. For each tool which is running an exemplar process but which is not running a target process, the prediction logic 212, continuously in real time, operates as described above to identify similar exemplar tools/controllers running both the exemplar and target processes and computes the pvp and tvt deltas to obtain the controller state delta for the target tool. In one embodiment, the controller state delta for the target tool, the actual controller state of the target tool and an Errors-to-Tolerance ("T/E") value are computed. This controller state delta is then stored in a database associated with the particular target tool. In this way, the target tool is always ready to be switched over to the target process if necessary by applying the controller state delta to the controller state of the exemplar process to obtain the target controller state for running the target process. In addition, statistical processing of the various delta values may be performed to compute a confidence value representative of the likelihood that the controller state delta, when applied to the exemplar controller state from the target tool, will achieve a controller state for the target process that obtains substantially optimal results. This confidence value may then be presented to the manufacturing personnel to advise them whether or not switching the target tool to the target process will be cost/resource effective.

Referring back to FIG. 4, the similarity processor 402 includes a database (not shown) of all of the available tools 102 and controllers 202, as well as the processes being run by the tools, in the manufacturing facility 100 which allows the similarity processor 402 to determine for the target tool 102, target controller 202 and exemplar and target processes, a similar exemplar tool 102 and exemplar controller 202 running the exemplar and target processes. In an alternate embodiment, the similarity processor 402 may be coupled with all of the available tools 102 so as to be able to determine what processes they are running and what controllers 202 are available. In an embodiment where the prediction logic 212 is provided for each tool group 104, the similarity processor 402 may be coupled only with tools 102 in the group.

The similarity processor 402, once having identified a similar exemplar tool 102 and exemplar controller 202, accesses the controller state history databases 208 of the exemplar and target tools 102 to retrieve the historical controller state data for the exemplar and target processes. The logic 404 then computes the pvp controller state delta between the controller states of the exemplar process running on the exemplar tool 102 and the controller states of the target process running on the exemplar tool 102. The logic 406 computes the tvt controller state delta between the controller states of the exemplar process running on the exemplar tool 102 and the controller states of the exemplar process running on the target tool 102. Obtaining the controller state of the exemplar process on the target tool 102 may require the processing of a pre-cursor/SAHD lot. The tvt and pvp deltas are then passed to the controller state generator 408 which computes the controller state delta between the controller state of the exemplar process running on the target tool and the predicted controller state for the target process running on the target tool 102. The controller state generator 408 may then further compute the predicted controller state for the target process running on the target tool 102. This state is then passed to the process controller 110 to be used as the initial controller state 204 for running the target process. In the real-time embodiment described above, the controller state delta and/or predicted controller state may be stored in an offset matrix/database 412 for later use and/or processed via a confidence processor 410 to determine the statistical probability that the predicted controller state will achieve substantially optimal results.

Figure 5:
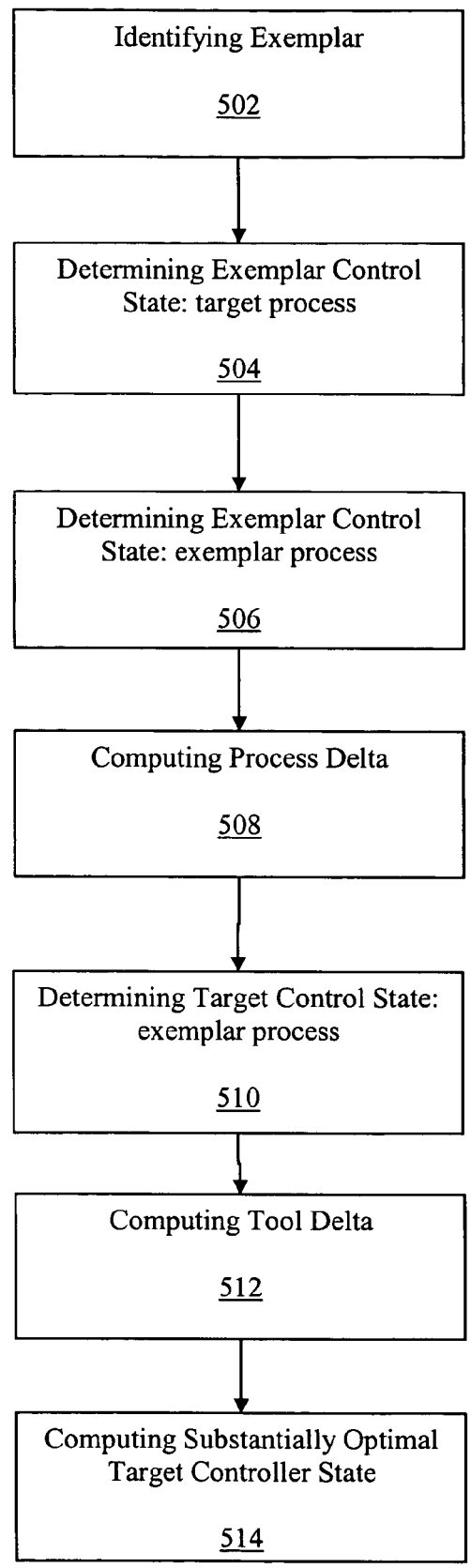
FIG. 5 depicts a flow chart showing operation of the controller state prediction processor of FIG. 4 according to one embodiment.

Referring to FIG. 5, a flow chart detailing operation of the disclosed system, according to one embodiment, is shown. The system determines a substantially optimal target controller state of a target process control system, the target process control system utilizing a target process control model in conjunction with the determined substantially optimal target controller state to direct a target semiconductor processing tool to execute a target process so as to likely achieve substantially optimal process results from the target process without further substantial adjustment of the determined substantially optimal target controller state. In operation, an exemplar semiconductor processing tool having an exemplar process control system and an exemplar process control model is identified (block 502), the exemplar process control model and exemplar semiconductor processing tool being substantially similar to the target process control model and the target semiconductor processing tool, the exemplar process control model and exemplar semiconductor processing tool having been used previously to execute both the target process and an exemplar process. It will be appreciated that the semiconductor processing tools do not necessarily have to be the same type of semiconductor processing tools in order to be substantially similar and that substantial similarity may occur any one or more operating parameters of the two semiconductor processing tools can be correlated. For example, correlation of the Pad Pressure of a CMP processing tool with the Alignment Translation parameter of a lithography processing tool would allow the disclosed embodiments to predict controller state as described herein. A first controller state of the exemplar process control system is determined as a result of at least one execution of the target process on the exemplar semiconductor processing tool (block 504). A second controller state of the exemplar process control system is determined as a result of at least one execution of the exemplar process on the exemplar semiconductor processing tool (block 506). A process delta between the first and second controller states is computed (block 508). A third controller state of the target process control system is determined as a result of at least one execution of the exemplar process on the target semiconductor processing tool (block 510). A tool delta between the second and third controller states is computed (block 512). The substantially optimal target controller state is then computed based on the third controller state and the process delta and the tool delta (block 514).

Figure 6:
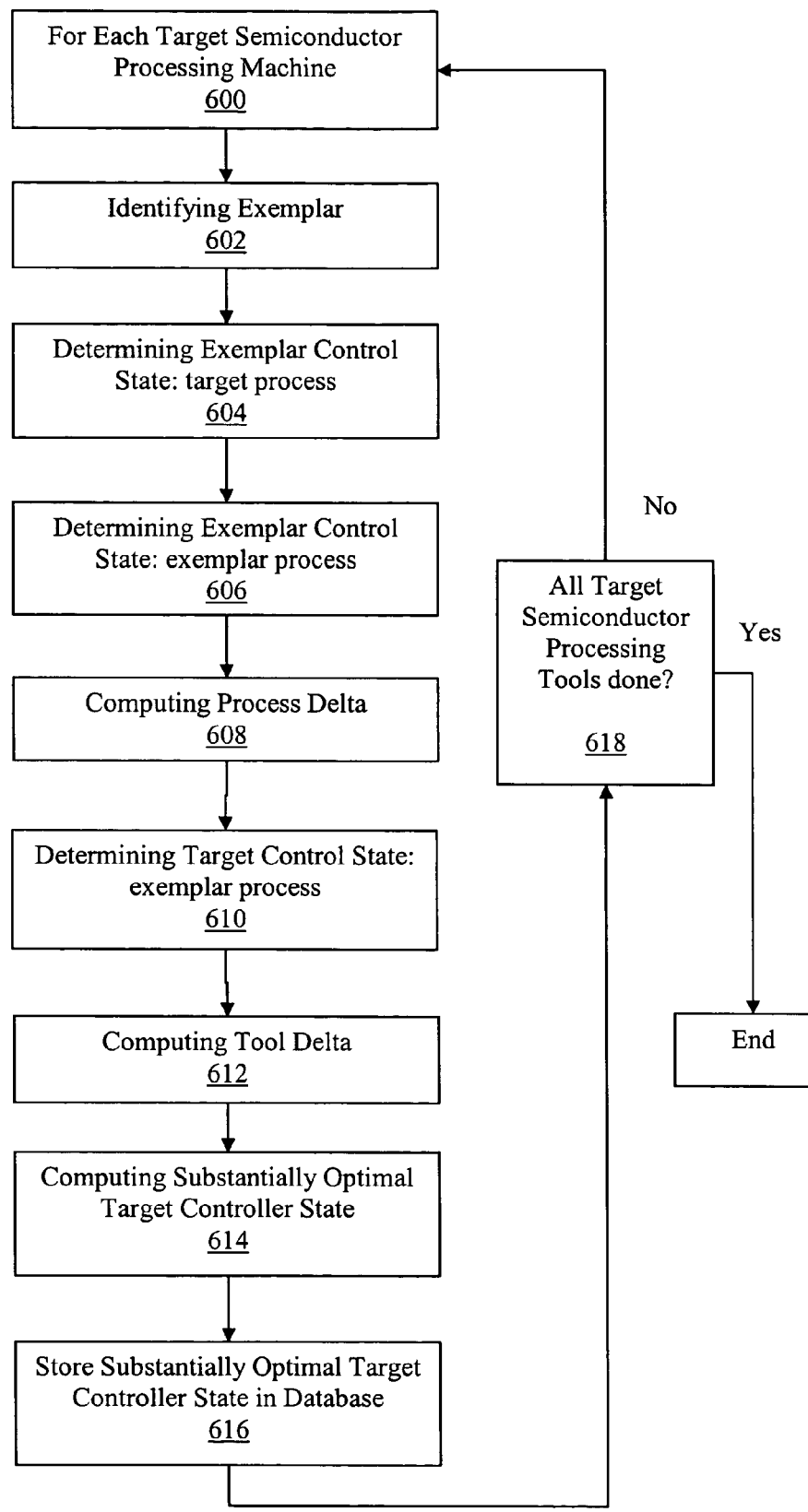
FIG. 6 depicts a flow chart showing operation of the controller state prediction processor of FIG. 4 according to an alternate embodiment.

Referring to FIG. 6, a flow chart detailing operation of the disclosed system, according to an alternate embodiment, is shown. The system determines a substantially optimal target controller state of a target process control system of each of a plurality of target semiconductor processing tools, each of the target process control systems utilizing one of a plurality of target process control models in conjunction with the determined substantially optimal target controller state to direct an associated of the plurality of target semiconductor processing tools to execute a target process so as to likely achieve substantially optimal process results from the target process without further substantial adjustment of the determined substantially optimal target controller state. In operation, For each of the plurality of target semiconductor processing tools and each of the associated target process control models (block 600), an exemplar semiconductor processing tool having an exemplar process control system and an exemplar process control model is identified, the exemplar process control model and exemplar semiconductor processing tool being substantially similar to the particular target process control model and the particular target semiconductor processing tool, the exemplar process control model and exemplar semiconductor processing tool having been used previously to execute both the target process and an exemplar process (block 602). It will be appreciated that the semiconductor processing tools do not necessarily have to be the same type of semiconductor processing tools in order to be substantially similar and that substantial similarity may occur any one or more operating parameters of the two semiconductor processing tools can be correlated. For example, correlation of the Pad Pressure of a CMP processing tool with the Alignment Translation parameter of a lithography processing tool would allow the disclosed embodiments to predict controller state as described herein. A first controller state of the identified exemplar process control system is determined as a result of at least one execution of the target process on the identified exemplar semiconductor processing tool (block 604). A second controller state of the identified exemplar process control system is determined as a result of at least one execution of the exemplar process on the identified exemplar semiconductor processing tool (block 606). A process delta between the first and second controller states is computed (block 608). A third controller state of the particular target process control system is determined as a result of at least one execution of the exemplar process on the particular target semiconductor processing tool (block 610). A tool delta between the second and third controller states is computed (block 612). The substantially optimal target controller state is computed based on the third controller state and the process delta and the tool delta (block 614). The substantially optimal target controller state is then stored in a database, the substantially optimal target controller state being stored in association with the particular target semiconductor processing tool and particular target process control model (block 616). The process is repeated for all of the tools 102, either in the entire facility or within a particular tool group 104 (block 618).

The prediction mechanism uses statistics, modeled algorithms and matrix based calculations to predict optimal settings for every controller available in the production cell. By performing these calculations in real time, there is never a point during production that a particular process controller is starved for an optimal controller state, which reduces the requirement for the system to relearn process settings. The mechanism relies on data which is collected and recorded as run to run control history and is available in almost all run-to-run control systems. This data is also updated regularly in order for SPC to monitor the control system.

Accordingly, the time required to reduce the impact of manufacturing events, both scheduled and unscheduled, is minimized. By introducing an apparatus that follows the prediction mechanics, a manufacturing facility is provided with the much needed flexibility to introduce and manufacture products in-tune with the present market demand and still maximize on throughput.

The present run-to-run system, applies SPC to monitor and statistical algorithms to control a manufacturing process. Therefore, if a manufacturing event (scheduled/unscheduled) occurs the prediction system will learn the process through a single SAHD/pre-cursor lot and then predict optimal settings for all other controllers to hit specified target, thereby reducing the need for other controllers to relearn. Additional setup is not required as the information required for predicting controller state is already used by Statistical Process Control in the run-to-run control system. With the aid of a rapid software development package, such as Visual Basic, published by Microsoft Corporation, located in Redmond, Wash., or MATLAB® published by The Mathworks, Corp. Natick, Mass., the data can be extracted and operated on by using algorithms brought forward by this invention.

In one exemplary embodiment, the disclosed system and method is used in the prediction of lithography process control settings in a semiconductor manufacturing environment via a model for inheritance which is based upon the concept of controller state in a mixed part semiconductor manufacturing factory. The concept of controller state analysis is expanded to develop a predictive model, by virtue of which control settings can be inherited within or across contexts/controllers. It will be appreciated that the mathematical computations necessary to implement the disclosed functionality may vary depending upon the implementation.

The following statistical equations may be used for the controller state prediction:

$$\text{Mean } (\overline{X}): \frac{\sum X_i}{n} \quad (1)$$

Where, $X_i$ is the sample; $n$ is the sample count $$\text{Variance } (S^2): \frac{\sum X_i^2 - \frac{(\sum X_i)^2}{n}}{n-1} \quad (2)$$

Where, $X_i$ is the sample; n is the sample count $$\text{Standard Deviation (S): } \sqrt{\text{Variance}} \quad (3)$$

$$\text{Range: } (X_{high} - X_{Low}) \quad (4)$$

Sigma Test: It is a test used to analyze, if the difference in controller state-I and controller state-II is statistically significant.

$$(\overline{X}_{CSI} - (\alpha * S_{CSI})) \leq (X_{CSII}) \leq (\overline{X}_{CSI} + (\alpha * S_{CSI})) \quad (5)$$

Where, $X_{CSI}$ is the Controller State-I mean; $S_{CSI}$ is Standard deviation of the controller state-I;

$X_{CSII}$ is the controller state-II; $\alpha$ is the sigma multiplication factor which is always less than 3 and can be use as a tuning parameter for tighter control of the process. Deadband Test: A test used to analyze if the delta in Controller state I and II is significant enough to have an effect on product.

$$|\Delta_{Controllerstate}| \leq (\text{deadband}) \quad (6)$$

Where, $\Delta_{controller\text{-}state}$ is the delta between the pre-event controller state (CS-I) and post-event controller state (CS-II); Deadband is the limit beyond which there is noticeable effect on product.

Error Approximation (nm): It is the approximate error in nanometers for each of the overlay parameters.

$$\text{Error}_{OVL\text{-}parameter}(\text{nm}) \approx (\Delta_{OVL\text{-}parameter} * \alpha) \quad (7)$$

Where, $\text{Error}_{OVL\text{-}parameter}$ is the error in units of nanometer; $\Delta_{OVL\text{-}parameter}$ is difference in controller state-I and controller state-II; $\alpha$ is the conversion factor specific to that overlay parameter.

Overall Error RSS (nm): It is the overall effect on Overlay in units of nanometer.
It is calculated by taking the Root of the sum of squares of the Error approximations for each overlay parameter.

$$\text{OverallError-}RSS \approx \sqrt{\Sigma(\text{Error}_{OVL\text{-}iparameter})^2} \quad (8)$$

Cascaded-Offset Settings Formula: This equation is used to apply the controller state delta calculated for the overlay parameters from one context/controller to another.

$$\text{Corrected-Opt.Setting}_{Context\text{-}2} = [(\text{Opt.Setting}_{Context\text{-}2}) + (\text{AppliedOffset}_{Context\text{-}1})] \quad (9)$$

Z-score test: This test is used to detect and remove outlier points. The mean, median of the entire data set are used to obtain a z-score for each data point, according to following formula:

$$Z_i = \frac{(x_i - \bar{x})}{s} \quad (10)$$

$$MAD = median|x_i - \bar{x}| \quad (11)$$

Percent Weighted Average: It is percent weighted average of the data points.

$$\bar{X}_{PWA} = \frac{\sum_{i=1}^{n} w_i \times x_i}{\sum_{i=1}^{n} w_i} \quad (12)$$

where $w_i$ is the weight value, $x_i$ is the data points, n is the total no of data points. Note: $w_i$ for the controller state calculation is calculated based on equation [13].

$$w_i = (l.c.*(lookbackdays - differenceindaysfromevent)) \quad (13)$$

Where, l.c. represents the smallest percent weight that can be assigned and is calculated using formula [14]

$$l.c. = \left(\frac{100}{lookbackdays}\right) \quad (14)$$

Where, 'lookbackdays' are the number of days to go back in time to collect process data.

Figure 7:
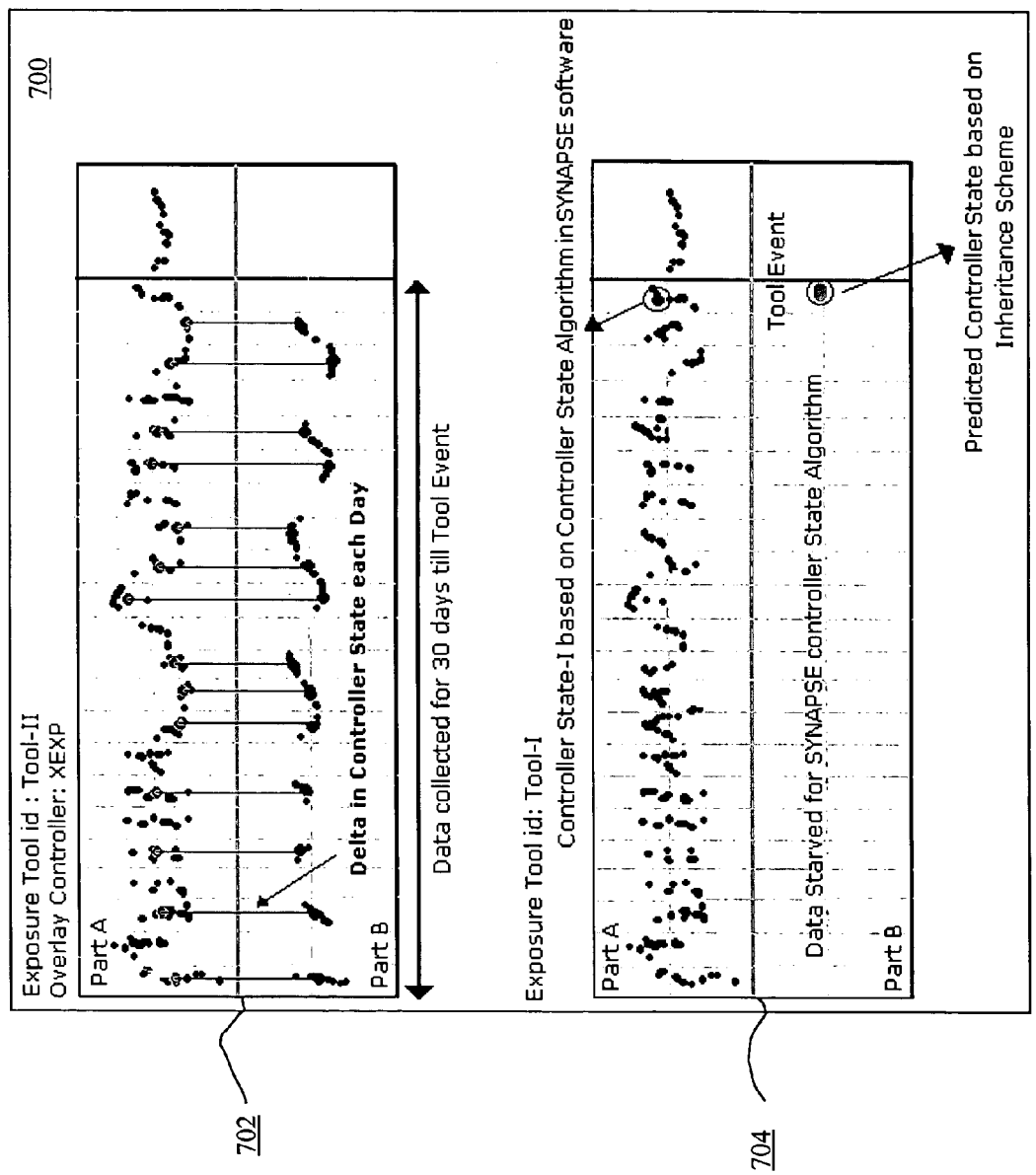
FIG. 7 depicts a graphical representation the run histories of exemplary and target semiconductor process tools for use with disclosed embodiments.

According to the disclosed embodiments, the controller setting for a part on a tool may be predicted by inheriting the settings from another part that has been running on the tool. The inheritance model first calculates the deltas for a controller between a high runner part (part with recent data on required tool) and the low runner part (part with no recent run history). These deltas are calculated per day between the parts on another similar tool, where both the parts have recent run history. Then a weighted average [Equation 15] of the deltas is taken and is applied to the controller state for the high runner part on the data starved tool [Equation 12]. This calculated setting is the predicted setting to process the low runner part on the tool in question. FIG. 7 depicts a graphical representation 700 of the concept where process tool-II 702 is the tool with run history for both parts and process tool-I 704 is the tool with run history for the high runner part only.

$X_{Delta\text{-}CState}$: Represents the weighted average of the deltas in controller state for each day between parts on a tool, as shown in figure a.

$$\bar{X}_{Delta\text{-}CState} = \frac{\sum_{i=1}^{n} w_i \times x_i}{\sum_{i=1}^{n} w_i} \quad (15)$$

where $w_i$ is the weight value, $x_i$ is the delta in controller state each day between two parts on a tool, and n is the no of days for which data is collected with respect to day of tool event.

Note: $w_i$ is calculated based on equation [11].

$$w_i = \frac{(100 - (\alpha * i))}{100} \quad (14)$$

where α is the multiplication factor to control the weight of the deltas.

Controller State (predicted): It represents the predicted controller state of the part/layer on a tool, which is data starved, i.e. has no data available on the required exposure tool.

$$ControllerState_{predicted} = (\bar{X}_{Delta\text{-}CState + Opt.Settingcontroller\text{-}reference}) \quad (15)$$

In one embodiment of the disclosed system and method, in order to simplify the approach for design of a prediction model, a rule system maybe required to be developed, based on the behavior and characteristics of the process controller. This rule system is used to develop groups of the various control-loops for the process controller. The benefits of this are that the prediction of control settings is only made for those contexts (technology/layer/part) which are within a specific group. The rule setup for the overlay controller is based on product technology node, exposure tool wavelength, exposure tool make, tool exposure mechanism (scanner or stepper), and exposure tool and wafer alignment method. The rule system for the Critical Dimension ("CD") controller is based on exposure tool wavelength, exposure tool make, tool exposure mechanism (scanner or stepper) and product exposure layer. The division of controllers based on the rule system specific to the process controller, provides the ability to inherit overlay settings either across Design/Part or across exposure tools which bare similar attributes, for the CD controller the rule system will allow for settings to be inherited across layer/reticle and across exposure tool.

Based on the rule system developed above for the process controller a matrix/database is created. The matrix is used to predict settings through the concept of inheritance, for example to allow the overlay and Critical Dimension controller inherit settings across tool and across Design in the case of overlay and across Reticle in the case of Critical Dimension.

History data for the controllers is collected for x-days in the past. The number of days to look back depends on the rule for data validity.

In one embodiment, the data is collected by extracting all of the optimized (applied) process settings from the feedback control system. The data then goes through filters and is then validated. The data filter algorithms look for all measured lots which were not reworked. The collected data is then separated by day and is validated to check for outliers before an average is taken. This is performed for each of the overlay control parameters.

Once the data has been collected, filtered and validated, an accurate prediction for the state of the controller with respect to the exposure tool, for example, is made.

The number of days over which to collect the data depends upon the time-horizon for the data and may be different for different feedback controllers. Once the data is collected the data is split into chunks based on the day they were collected. The data points are then filtered to remove outlier points and then an average of the remaining points is taken, depending on the availability of data for each day. To obtain a prediction which is most recent and accurate a percent weighted average ("PWA") of the day averages is calculated. The percent weighted average helps to nullify the effect of process shifts per day that might be present and will distort the mean. The final average represents the current state of the tool and is also called Feedback Controller State.

Once the prediction model, discussed above, is created and the data has been collected and sanitized, the process settings are calculated. This model may be applicable to predict process settings in the following situations: The most common scenario would be a scheduled preventive maintenance event, which could entail laser change, stage correction, chuck clean/replacement etc. Once such an event takes place it is imperative to ascertain the pre and post event state of the controller. A pre-cursor or send-ahead lot is run and the metrology results obtained are compared with the pre-tool event controller state, to adjudge if the change is significant based on control limits. In many cases it is not possible to make such an analysis as the data for the controller is limited and not recent enough. It is here that the prediction model allows the process engineer to obtain a recent predicted state of the controller by calculating the offsets across columns (tool-to-tool) and across rows (controller to controller) of the matrix. It must be understood that the offsets are taken from those controllers which are not data-starved.

The procedure explained above can be realized by developing a software program to perform the above calculations for the multiplicity of parameters. This would reduce the delay associated with data collection, filtering, matrix build-up and final calculation of offsets for the prediction.

In today's highly modernized semiconductor manufacturing plants, where processing every wafer the most optimal settings is imperative, the prediction model is a powerful tool for the engineer who would like to process his wafers, with minimal rework and out of control issues. Another case where the prediction model sees its utility is the ability for it to predict the process settings of a newly introduced controller, without having to process a pre-cursors or a send-ahead. The controller for which settings are required, is inserted into matrix and by finding offsets from other controllers that have been recently running on the exposure tool, as explained above, the optimal process settings can be predicted. This greatly reduces the need to run multiple send-ahead lots, which may have been potential out of control cases.

It is therefore intended that the foregoing detailed description be regarded as illustrative rather than limiting, and that it be understood that it is the following claims, including all equivalents, that are intended to define the spirit and scope of this invention.

We claim:

1. A method of determining a substantially optimal target controller state of a target process control system, the target process control system utilizing a target process control model in conjunction with the determined substantially optimal target controller state to direct a target semiconductor processing tool to execute a target process so as to likely achieve substantially optimal process results from the target process without further substantial adjustment of the determined substantially optimal target controller state, the method comprising:

identifying an exemplar semiconductor processing tool having an exemplar process control system and an exemplar process control model, the exemplar process control model and exemplar semiconductor processing tool being substantially similar to the target process control model and the target semiconductor processing tool, the exemplar process control model and exemplar semiconductor processing tool having been used previously to execute both the target process and an exemplar process;

determining a first controller state of the exemplar process control system as a result of at least one execution of the target process on the exemplar semiconductor processing tool;

determining a second controller state of the exemplar process control system as a result of at least one execution of the exemplar process on the exemplar semiconductor processing tool;

computing a process delta between the first and second controller states;

determining a third controller state of the target process control system as a result of at least one execution of the exemplar process on the target semiconductor processing tool;

computing a tool delta between the second and third controller states; and computing the substantially optimal target controller state based on the third controller state and the process delta and the tool delta.

2. The method of claim 1, further comprising:

applying the substantially optimal target controller state to the target process control model to configure the target process control system to direct the target semiconductor processing tool to execute the target process.

3. The method of claim 1, further comprising:

computing a confidence value representing a likelihood of achieving substantially optimal process results from the target process on the target semiconductor processing tool using the substantially optimal target controller state.

4. The method of claim 3, further comprising:

alerting when the confidence value exceeds a threshold value.

5. The method of claim 1, wherein the determining of the first controller state further comprises:

executing, iteratively, the exemplar process based on an initial controller state and, after each iteration, evaluating the process results and refining the initial controller state for the next iteration if the evaluated process results are sub-optimal, the first controller state comprising the refined controller state of the iteration where the evaluated process results are optimal.

6. The method of claim 5, wherein the determining of the first controller state further comprises computing the first controller state as a weighted average of the refined controller states of a plurality of iterations where the evaluated process results are optimal.

7. The method of claim 1, wherein the determining of the second controller state further comprises:

executing, iteratively, the target process based on an initial controller state and, after each iteration, evaluating the process results and refining the initial controller state for the next iteration if the evaluated process results are sub-optimal, the second controller state comprising the refined controller state of the iteration where the evaluated process results are optimal.

8. The method of claim 7, wherein the determining of the second controller state further comprises computing the second controller state as a weighted average of the refined controller states of a plurality of iterations where the evaluated process results are optimal.

9. The method of claim 1, wherein the determining of the third controller state further comprises:

executing, iteratively, the exemplar process based on an initial controller state and, after each iteration, evaluating the process results and refining the initial controller state for the next iteration if the evaluated process results are sub-optimal, the third controller state comprising the refined controller state of the iteration where the evaluated process results are optimal.

10. The method of claim 9, wherein the determining of the first controller state further comprises computing the third controller state as a weighted average of the refined controller states of a plurality of iterations where the evaluated process results are optimal.

11. The method of claim 1, wherein the target semiconductor processing tool is substantially the same semiconductor processing tool as the exemplar semiconductor processing tool.

12. The method of claim 11, wherein the execution of the target and exemplar processes on the exemplar semiconductor processing tool occur prior to an event and the execution of the exemplar process on the target semiconductor processing tool occurs after the event.

13. The method of claim 12, wherein the event comprises maintenance of the target semiconductor processing tool.

14. The method of claim 11, wherein the computing of the tool delta further comprises defining the tool delta to be no delta.

15. The method of claim 1, wherein the target process control model is different from the exemplar process control model.

16. The method of claim 1, wherein the first semiconductor processing tool previously executed the target process.

17. The method of claim 1, wherein the identifying further comprises correlating similarities between the exemplar and target semiconductor tools and between the exemplar and target process control models.

18. A system operative to determine a substantially optimal target controller state of a target process control system, the target process control system utilizing a target process control model in conjunction with the determined substantially optimal target controller state to direct a target semiconductor processing tool to execute a target process so as to likely achieve substantially optimal process results from the target process without further substantial adjustment of the determined substantially optimal target controller state, the system comprising:

first logic operative to identify an exemplar semiconductor processing tool having an exemplar process control system and an exemplar process control model, the exemplar process control model and exemplar semiconductor processing tool being substantially similar to the target process control model and the target semiconductor processing tool, the exemplar process control model and exemplar semiconductor processing tool having been used previously to execute both the target process and an exemplar process;

second logic coupled with the first logic and operative to determine a first controller state of the exemplar process control system as a result of at least one execution of the target process on the exemplar semiconductor processing tool;

third logic coupled with the first logic and operative to determine a second controller state of the exemplar process control system as a result of at least one execution of the exemplar process on the exemplar semiconductor processing tool;

fourth logic coupled with the first logic and operative to determine a third controller state of the target process control system as a result of at least one execution of the exemplar process on the target semiconductor processing tool;

a fifth logic coupled with the second, third and fourth logic and operative to compute a process delta between the first and second controller states, compute a tool delta between the second and third controller states and compute the substantially optimal target controller state based on the third controller state and the process delta and the tool delta.

19. The system of claim 18, wherein the processor is further operative to apply the substantially optimal target controller state to the target process control model to configure the target process control system to direct the target semiconductor processing tool to execute the target process.

20. The system of claim 18, wherein the processor is further operative to compute a confidence value representing a likelihood of achieving substantially optimal process results from the target process on the target semiconductor processing tool using the substantially optimal target controller state.

21. The system of claim 20, wherein the processor is further operative to assert a signal when the confidence value exceeds a threshold value.

22. The system of claim 18, wherein the second logic is further operative to execute, iteratively, the exemplar process based on an initial controller state and, after each iteration, evaluating the process results and refining the initial controller state for the next iteration if the evaluated process results are sub-optimal, the first controller state comprising the refined controller state of the iteration where the evaluated process results are optimal.

23. The system of claim 22, wherein the second logic is further operative to compute the first controller state as a weighted average of the refined controller states of a plurality of iterations where the evaluated process results are optimal.

24. The system of claim 18, wherein the third logic is further operative to execute, iteratively, the target process based on an initial controller state and, after each iteration, evaluating the process results and refining the initial controller state for the next iteration if the evaluated process results are sub-optimal, the second controller state comprising the refined controller state of the iteration where the evaluated process results are optimal.

25. The system of claim 24, wherein the third logic is further operative to compute the second controller state as a weighted average of the refined controller states of a plurality of iterations where the evaluated process results are optimal.

26. The system of claim 18, wherein the fourth logic is further operative to execute, iteratively, the exemplar process based on an initial controller state and, after each iteration, evaluating the process results and refining the initial controller state for the next iteration if the evaluated process results are sub-optimal, the third controller state comprising the refined controller state of the iteration where the evaluated process results are optimal.

27. The system of claim 26, wherein the fourth logic is further operative to compute the third controller state as a weighted average of the refined controller states of a plurality of iterations where the evaluated process results are optimal.

28. The system of claim 18, wherein the target semiconductor processing tool is substantially the same semiconductor processing tool as the exemplar semiconductor processing tool.

29. The system of claim 28, wherein the execution of the target and exemplar processes on the exemplar semiconductor processing tool occur prior to an event and the execution of the exemplar process on the target semiconductor processing tool occurs after the event.

30. The system of claim 29, wherein the event comprises maintenance of the target semiconductor processing tool.

31. The system of claim 28, wherein processor is further operative to define the tool delta to be no delta.

32. The system of claim 18, wherein the target process control model is different from the exemplar process control model.

33. The system of claim 18, wherein the first semiconductor processing tool previously executed the target process.

34. The system of claim 18, wherein the first logic is further operative to correlate similarities between the exemplar and target semiconductor tools and between the exemplar and target process control models.

35. A system for determining a substantially optimal target controller state of a target process control system, the target process control system utilizing a target process control model in conjunction with the determined substantially optimal target controller state to direct a target semiconductor processing tool to execute a target process so as to likely achieve substantially optimal process results from the target process without further substantial adjustment of the determined substantially optimal target controller state, the method comprising:

means for identifying an exemplar semiconductor processing tool having an exemplar process control system and an exemplar process control model, the exemplar process control model and exemplar semiconductor processing tool being substantially similar to the target process control model and the target semiconductor processing tool, the exemplar process control model and exemplar semiconductor processing tool having been used previously to execute both the target process and an exemplar process;

means for determining a first controller state of the exemplar process control system as a result of at least one execution of the target process on the exemplar semiconductor processing tool;

means for determining a second controller state of the exemplar process control system as a result of at least one execution of the exemplar process on the exemplar semiconductor processing tool;

means for determining a third controller state of the target process control system as a result of at least one execution of the exemplar process on the target semiconductor processing tool;

means for computing a process delta between the first and second controller states, computing a tool delta between the second and third controller states and computing the substantially optimal target controller state based on the third controller state and the process delta and the tool delta.

* * * * *